United States Patent [19]

Yoshida et al.

[11] Patent Number: 4,780,178

[45] Date of Patent: Oct. 25, 1988

[54] ROTARY EVAPORATOR WITH CONTROL SYSTEM

[75] Inventors: Naoki Yoshida, Sagamihara; Tatsuhiko Saito, Machida; Takao Kawakami, Kitamoto, all of Japan

[73] Assignee: Yamoto Scientific Co. Ltd., Japan

[21] Appl. No.: 11,450

[22] Filed: Feb. 6, 1987

Related U.S. Application Data

[60] Division of Ser. No. 858,907, Apr. 30, 1986, abandoned, which is a continuation of Ser. No. 525,230, Aug. 22, 1983, abandoned.

[30] Foreign Application Priority Data

| Oct. 15, 1982 | [JP] | Japan | 57-155088[U] |
| Oct. 15, 1982 | [JP] | Japan | 57-155090[U] |
| Oct. 16, 1982 | [JP] | Japan | 57-181779 |
| Nov. 25, 1982 | [JP] | Japan | 57-205445 |

[51] Int. Cl.$^4$ .......................... B01D 1/22; B01D 1/30
[52] U.S. Cl. ........................... 159/6.1; 159/44; 159/49; 202/205; 202/238; 203/DIG. 2; 203/DIG. 7; 422/99; 422/107; 422/109
[58] Field of Search ................ 159/6.1, 9.1, 11.1, 159/11.2, 11.3, 12, 25.1, 44; 203/1, 89, DIG. 2, DIG. 7, 91; 202/238, 205; 422/99, 101, 102, 107-109

[56] References Cited

U.S. PATENT DOCUMENTS

| 2,865,445 | 12/1958 | Buchler | 159/11.2 |
| 2,955,025 | 10/1960 | Conlon | 422/107 |
| 3,250,687 | 5/1966 | Frank | 202/238 |
| 3,342,696 | 9/1967 | Bush | 203/89 |
| 3,783,312 | 1/1974 | Schindel et al. | 310/74 |
| 4,030,834 | 6/1977 | Bauer et al. | 422/72 |
| 4,171,495 | 10/1979 | McNinch, Jr. | 310/266 |
| 4,226,537 | 10/1980 | Colly | 422/72 |
| 4,259,604 | 3/1981 | Aoki | 310/266 |
| 4,522,684 | 6/1985 | Saito | 159/11.2 |

FOREIGN PATENT DOCUMENTS

| 554836 | 3/1958 | Canada | 159/11.2 |
| 2600298 | 8/1977 | Fed. Rep. of Germany | 203/DIG. 2 |
| 2722066 | 11/1978 | Fed. Rep. of Germany | 202/238 |
| 351945 | 3/1961 | Switzerland | 159/11.2 |

*Primary Examiner*—Benoit Castel
*Attorney, Agent, or Firm*—Jones, Askew & Lunsford

[57] ABSTRACT

Rotation driving apparatus usable with a rotary evaporator for holding a sample vessel in a water bath. The driving apparatus includes a stator supported by an elevating member mounted alongside the water bath, and a rotor mounted on the inside of the stator. A hollow support shaft is mounted within the rotor, and the sample vessel is detachably connected to one end of the support shaft. A concentrator can be connected to the other end of the support shaft, for fluid communication with the sample vessel through the hollow support shaft. The support shaft is affixed to the rotor, so that the sample vessel and concentrator are rotated as the rotor turns. A slitted disk is supported by the rotor, and a photosensor produces signals in response to relative movement of the slits. These signals are used for controlling the rotation of the driving apparatus.

1 Claim, 3 Drawing Sheets

ROTARY EVAPORATOR WITH CONTROL SYSTEM

This application is a division of Ser. No. 858,907 filed Apr. 30, 1986 and now abandoned, which is in turn a continuation of Ser. No. 525,230 filed Aug. 22, 1983 and now abandoned.

BACKGROUND OF THE INVENTION

The present device relates to an rotary evaporator, and more paticulary to an rotary evaporator which rotates an eggplant-shaped flask directly by a rotation driving apparatus without a reduction device.

In a conventional rotary evaporator, a worm gears mechanism rotates a sample vessel such as an eggplant-shaped flask and the like in cooperation with a motor. Therefore this conventional evaporator has shortcomings such that the construction in all become large size and in engagement of gears yields noise and wear of the gears.

SUMMARY OF THE INVENTION

A object of the invention is to provide a small and light-weight rotary evaporator which can be realized due to omission of reduction system.

Another object of the invention is to provide a rotary evaporator in which an unbalanced load which will act on an elevating member will be reduced.

Briefly described these and other objects of the invention are accomplished by provision of a rotary evaporator in which a sample vessel applys to a rotary shaft which is hollow.

DETAILED DESCRIPTION OF THE PREFERRED EMBODIMENT

Figure 1:
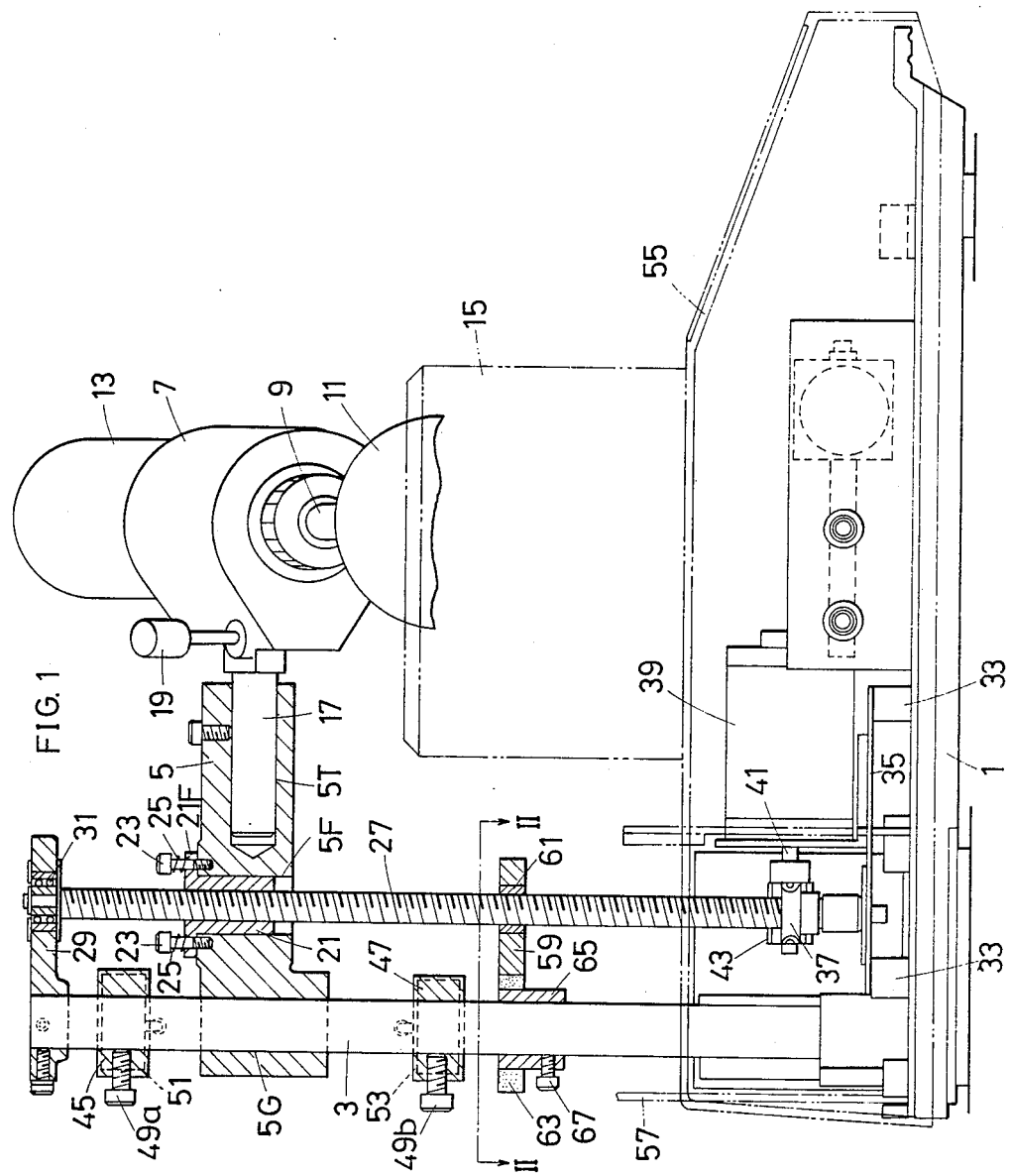
FIG. 1 is a vertical cross sectional view of the preferred embodiment of the present invention.
Figure 2:
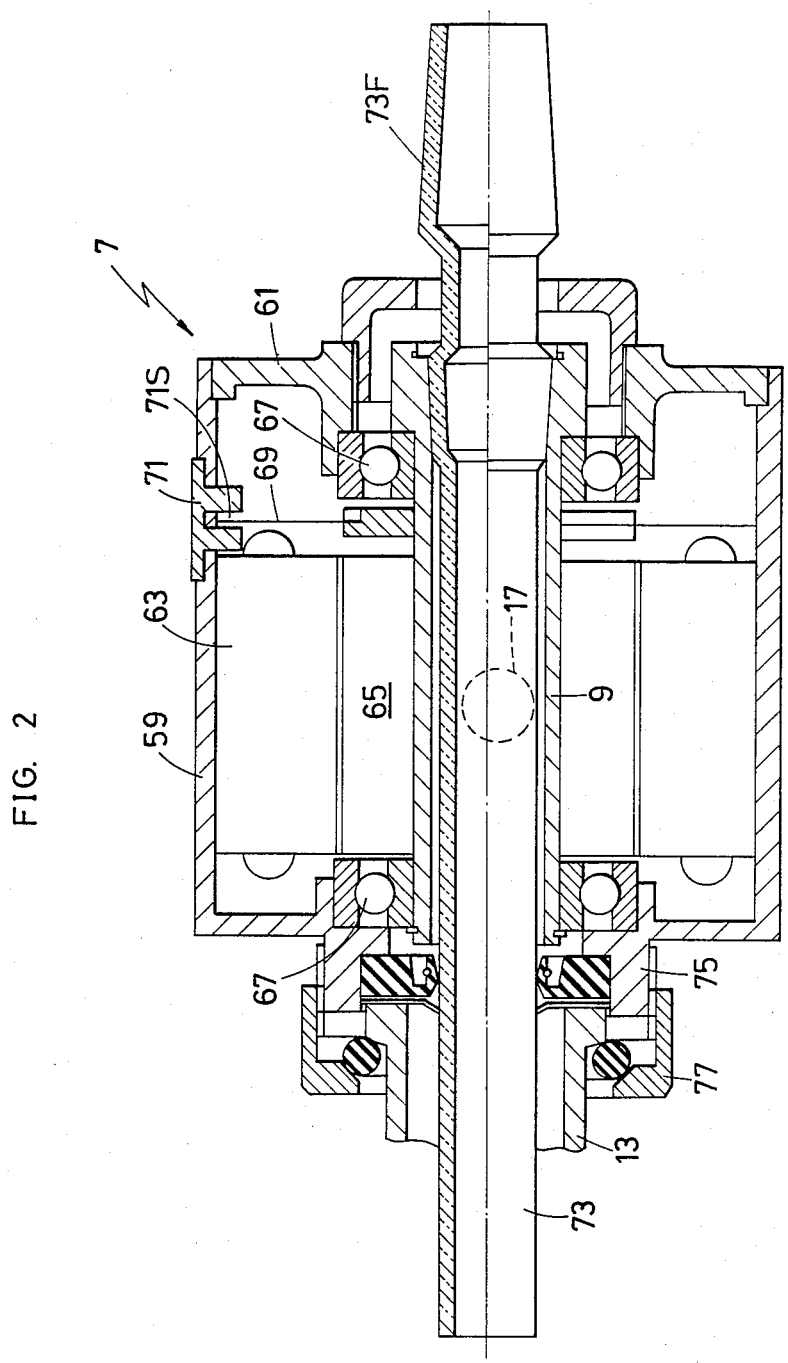
FIG. 2 is a cross sectional view of a rotation driving apparatus.

Refering to FIG. 1 and FIG. 2, the rotary evaporator according to this embodiment is constituted in such a manner that an elevating member 5 is vertically and elevationally supported to a pole 3 vertically mounted on a base 1. A sample vessel 11 such as an eggplant-like flask of the like is removably attached to one end of a hollow rotary shaft 9 of a rotation driving apparatus 7 supported to this elevating member 5. A concentrator 13 is removably attached to the other end of the rotary shaft 9. A water bath 15 is provided to heat the sample vessel 11.

Next, each part will be described in detail; however, since the sample vessel 11 and the concentrator 13 are similar to those which will be generally used, their detailed explanation are omitted. Although the water bath 15 is not shown in detail in FIGS. 1-3, it is equipped with a heater to heat water and a temperature sensor to detect a water temperature. This heater is ON/OFF controlled by a control unit such as a microcomputer to always keep the water temperature in the water bath 15 to be a predetermined temperature.

A guide hole 5G is formed in the base portion of the elevating member 5, so that the elevating member 5 is vertically and slidably attached to the pole 3 mounted vertically on the base 1. The rotation driving apparatus 7 is supported to the end portion of the elevating member 5. A fitting hole 5T is further formed horizontally in the elevating member 5. The rotation driving apparatus 7 is rotatably or fixedly supported to a transverse shaft 17 which is inserted and fixed into the fitting hole 5T. Hence, the rotation driving apparatus 7 can be revolved (inclined) around the transverse shaft 17 by loosening a lever 19 provided for the rotation driving apparatus 7. The rotation driving appartus 7 can be integrally fixed to the transverse shaft 17 by fastening the lever 19. Therefore, an angle of inclination of the sample vessel 11 or the like can be adjusted by appropriately revolving and fixing the rotation driving apparatus 7.

An inserting hole 5F is vertically formed almost near the central portion of the elevating member 5. A nut member 21 with a flange 21F is loosely inserted into this inserting hole 5F. In other words, a small clearance is provided between the inserting hole 5F and the nut member 21 for allowing a small relative motion between the nut member 21 and the elevating member 5. A plurality of bolts 23 are integrally fitted to the elevating member 5 by loosely piercing through the flange 21F of the nut member 21. Spring members 25 such as a coil spring are interposed between the heads of the bolts 23 and the flange 21F. In this embodiment, the nut member 21 is inserted into the inserting hole 5F from the bottom to the upper portion; however, it may be inserted from the top.

The nut member 21 is threadably fitted to an elevational operating pipe 27 provided in parallel with the pole 3. The upper end portion of this elevational operating pipe 27 is rotatably supported through a bearing 31 to a bracket 29 fixed to the upper end portion of the pole 3 by means of a plurality of bolts or the like. The lower end portion of the pipe 27 is also rotatably supported to a subbase 35 supported to the base 1 through a plurality of cushioning members 33 such as elastic rubber. Hence, the lower end portion of the elevational operating pipe 27 can freely, slightly and horizontally move.

A worm gear 37 is integrally fixed near the lower end portion of the elevational operating pipe 27. This worm gear 37 always engages a worm 43 which is integrally formed on an output shaft 41 of a motor 39 for rotation in the forward/reverse directions mounted on the subbase 35. Hence, the elevational operating pipe 27 will forwardly or reversely rotate by suitably driving the motor 39 for rotation, thereby causing the elevating member 5 to move vertically along the pole 3.

The rotation driving apparatus 7 is attached to the end portion of the elevating member 5. Thus, in FIG. 1, the portion near the central portion of the vertical elevational operating pipe 27 intends to curve and protrude slightly toward the left direction. However, this curve of the elevational operating pipe 27 will be prevented since the subbase 35, which supports the lower end portion of the elevational operting pipe 27, slightly move to the left in FIG. 1 and a small relative deviation occurs due to a loose engagement between the nut member 21 and the elevating member 5. In other words, the lower end portion of the elevational operating pipe 27 slightly moves to the left in FIG. 1, so that the pipe 27 inclines. However, since the nut member 21 is loosely inserted into the elevating member 5, the nut member 21 slightly inclines against the elevating member 5. Therefore, there will be no inconvenience in the engagement between the nut member 21 and the elevational operating pipe 27. Hence, the elevating member 5 can smoothly and vertically move by rotation of the elevational operating pipe 27, and thus will not produce a squeaking noise.

As described above, when the elevating member 5 vertically moves along the pole 3 with the rotation of the motor 39, the upper and lower limits are arbitrarily set by an upper limit setting device 45 and a lower limit setting device 47 which are attached to the upper and lower end portions of the pole 3 for free adjustment of the location. The upper and lower limit setting devices 45 and 47 are fixed to the pole 3 by means of fixing members 49a and 49b such as a bolt, and the respective devices 45 and 47 are provided with sensing devices 51 and 53 such as a limit switch, respectively. Therefore, when the respective sensing devices 51 and 53 operate by an ascent or descent of the elevating member 5, it is possible to set the upper and lower limits of the elevating member 5 by stopping the rotation of the motor 39. Thus, the sample vessel 11 can be always set, to a fixed location against the water bath 15, thereby preventing vain overelevation of the elevating member 5.

As described above, the motor 39 is stopped by means of the sensing devices 51 and 53; however, it is not limited to such devices. It may also be possible to stop the motor 39 in such a manner that when the load of the motor 39 changes due to contact of the elevating member 5 with the upper limit setting device 45 or the lower limit setting device 47, a change in load of this motor 39 is detected.

The motor 39 or the like are loaded in a casing 55 and the pole 3 or the like are contained in a cover 57.

Referring now to FIG. 2, the structure of the rotation driving apparatus 7 will be explained. An annular cap 61 is fixed to one end of a cylindrical housing-like stator frame 59 of the rotation driving apparatus 7 and a stator core 63 is fixed in the stator frame 59. A rotor core 65 locating at the central portion of the stator core 63 is fixedly supported to the hollow rotary shaft 9. The rotor core 65 and stator core frame 59 are made of iron. Both ends of this rotary shaft 9 are rotatably supported through a pair of bearings 67 to the stator frame 59 and the cap 61. A slit disk 69 is integrally attached to the rotary shaft 9. This slit disk 69 is mounted very closely to the rotor core 65 and a great many small holes or slits (not shown) are formed at regular intervals in the circumferential edge of the slit disk 69. This circumferential edge passes through a gap 71S of a photosensor 71 mounted on the stator frame 59 near the stator core 63.

Hence, when the rotary shaft 9 rotates upon starting the rotation driving apparatus 7, pulses are generated from the photosensor 71. Therefore, counting these pulses enables a rotating speed of the rotation driving apparatus 7 to be detected. The rotation of the rotation driving apparatus 7 can be precisely controlled by performing feed-back control or the like.

A hollow tube member 73 is inserted and fixed to the rotary shaft 9. A taper attaching device portion 73F is formed at one end of this hollow tube member 73 to removably fit the sample vessel 11 such as an afore-mentioned eggplant-like flask or the like. The other end is deeply insered into the concentrator 13 (refer to FIG. 1) which is removably supportd to the stator frame 59 of the rotation driving apparatus 7. The concentrator 13 is fixed by an annular nut 77 to a supporting portion 75 which is protrudingly formed at the central portion of the other end of the stator frame 59.

As will be understood from the above-described structure, a rotation detecting device consisting of the photosensor 71 and the slit disk 69 is loaded in the stator frame 59 very closely to the stator core 63 or the like, so that an entirely small rotation driving apparatus 7 can be realized. Moreover, a rotating speed of the rotation driving apparatus 7 is detected using the slit disk 69 and the photosensor 71, so that even when they are equipped near the stator core 63 or the like, they will not be electromagnetically affected. Even at an extremely low rotating speed, the rotating speed can be correctly detected; furthermore, the rotation drivng apparatus 7 can be accurately controlled by performing feed-back control or the like even at a lower-speed rotation.

With such a structure, an angle of inclination of the rotation driving apparatus 7 is properly set by operating the lever 19 in accordance with the size of the sample vessel 11 to be used, and the vertical locations of the upper and lower limit setting devices 45 and 47 are suitably set. Thereafter, when the elevational operating pipe 27 is revolved forwardly by starting the motor 39, the elevating member 5 moves up and the motor 39 stops at the location where the upper limit setting device 45 operates, then the elevating member 5 stops ascending. As described above, when the elevating member 5 elevates and rests in the stop location, the sample vessel 11 may be removed from the rotation driving apparatus 7 or a proper sample may be put in the sample vessel 11. Then, the rotation driving apparatus 7 is activated to rotate the sample vessel 11. On the other hand, when the elevational operating pipe 27 is revolved reversely by starting the motor 39, the elevating member 5 moves down and the sample vessel 11 enters the water bath 15. When the lower limit setting device 47 operates with the descent of the elevating member 5, the motor 39 stops and the elevating member 5 is positioned at its stop location.

As the sample vessel 11 is rotated and heated in the water bath 15, the sample in the sample vessel 11 will be evaporated to be concentrated one hand, the vapor will be concentrated in the concentrator 13.

As described above, when the elevating member 5 is vertically moved by the rotation of the motor 39, even if an unbalanced load acts on the elevating member 5, the elevating member 5 will smoothly and vertically move as already explained previously. The upper and lower, limit locations of the elevating member 5 are preliminarily and independently set, so that it is possible to efficiently repeat a concentration or the like using a sample vessel 11 with the same capacity. Furthermore, the small and light-weighted rotation driving apparatus 7 can be realized due to omission of a reduction system, so that an unbalanced load which will act on the elevating member 5 will be reduced.

Hereinbelow, a system for controlling rotation of a rotary evaporator will be described.

Figure 3:
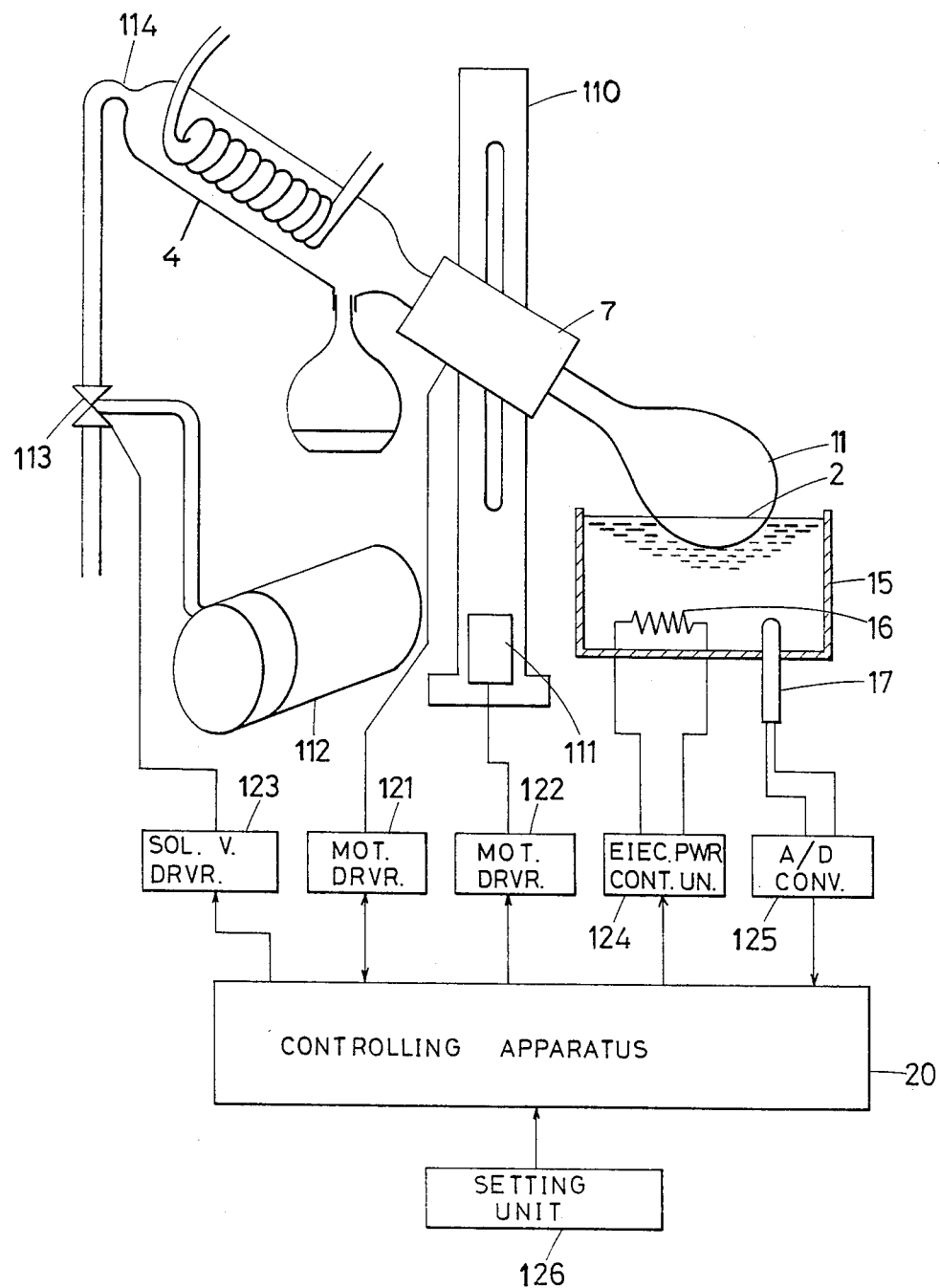
FIG. 3 is a view of one embodiment of a controlling system.

FIG. 3 shows one example of arrangement, embodying a controlling system in accordance with the present invention, wherein there are shown a lift 100 for supporting and placing the evaporator body in its vertical position, a motor 111 driving the evaporator body to vertically move along the lift 100, a vacuum pump 112, a solenoid valve 113 for switching a connection of the evaporator's vacuum suction inlet 114 with the vacuum pump 112 or atmosphere, an isothermal water tank 15, a heater 16 arranged in the water tank 15 for heating up the water contained therein, a temperature sensor 17 capable of sensing water temperature in the water tank 15, a controlling apparatus 20 adapted to control the rotation driving apparatus 7, the lift motor 111, the solenoid valve 113 and the heater 16, a motor driver 121 (1) for controlling the motor for its rotational speed in response to an output fed from the controlling apparatus 20, a motor driver 122 for actuating the lift motor 11 in response to an output fed from the controlling apparatus 20, a solenoid valve driver 123 adapted to switch on or off the solenoid valve 113 in response to an instruction of the controlling apparatus 20, an electric power controlling unit 124 adapted to supply electric power to the heater 16 in response to an output fed from the controlling apparatus 20, an A/D converter 125 capable of converting an analog signal fed by the temperature sensor 17 into a digital representation for transfer into the controlling apparatus, and a setting unit 126 adapted to set rotational speeds of the rotation driving apparatus 7, temperature of the isothermal water tank 15, and time periods of concentrating operation, and also functioning to instruct the lift motor to start-up an interrupting drive at a suitable timing as desirable. The setting unit 126 can provide the following functions.

(1) Calculation of charging power for the motor 7 according to rotational speeds predetermined.
(2) Calculation of charging power for the heater 16 according to the temperature of isothermal water tank predetermined.
(3) Countering of the concentrating time period predetermined.
(4) Feeding of a signal to the lift motor, instructing it to start an upward drive upon passage of the concentrating time period
(5) Actuation of the solenoid valve 113 to switch over to an atmospheric air side upon passage of the concentrating time period. (6) Actuation of the lift motor 111 to run in an optional direction, as occasions call for, responding to an interrupting input fed from the setting unit 126.

The operation of the system for controlling rotation will be described hereinbelow.

First, upon determination of a temperature for the isothermal water tank 15 via the setting unit 126, the heater 16 is driven to reach to this predetermined temperature. When the isothermal water tank 15 is heated up approximately to the predetermined temperature, a buzzer begins sounding to indicate to an operator that the water tank is heated up to the predetermined temperature. When an operator adjusts the setting unit 126 to set a rotational speed for the rotation driving apparatus 7 driving the flask to rotate in response to this buzzing sound, the rotation driving apparatus is charged with a given electric power matching the rotational speed predetermined. Then, an operator drives the lift motor 111 via the setting unit 126, whereby submerging the flask for the specimen suitably deep into the isothermal water in the isothermal water tank and bringing the lift motor 11 into a standstill. This driving of the lift motor 111 is effected by an interruption, and an operator can stop the motor 111 at any optional position, as occasions call for. Then, upon setting the concentrating time period by manipulation of the setting unit 126, measurement of such concentrating time period is started up. Actual passage of time is watched to compare it with the concentrating time period predetermined at a given time interval, and procedures for terminating the concentrating process are started upon passage of time period predetermined. After the predetermined concentrating time period has passed, the controlling apparatus 20 drives the lift motor 111 to raise the evaporator body up to a top dead point of the lift 110 for retention thereat. Then, the solenoid valve 113 is actuated to switch its connection from the vacuum side to the atmospheric side, thereby introducing an atmosphere air into the evaporator inside. Then, the motor 7 is stopped, causing the specimen flask to cease rotating.

As described hereunto, an embodiment of the present invention can accomplish raising of the evaporator body, introduction of the atmospheric air and stoppage of the rotating flask in an automatic way upon passage of the concentrating time period, thereby eliminating a cumbersome operation at the end of concentrating process, and besides since the evaporator body is brought into a non-heating condition after termination of the concentrating time period, a controlling system can be provide without any risk of over-concentrating.

The present invention is not limited to only the above-described embodiment, but it can be performed with other embodiments by suitable variation. For example, the above mentioned system for controlling rotation can include a system in which an initial and final rotational speed of a motor for driving the flask are predetermined, and these predetermined data are utilized to slow down the rotational speed of the motor at every passage of a given time period into the final rotational speed just immediately before the end of the predetermined concentrating time period.

What is claimed is:

1. An evaporator system for supporting a flask and rotating the flask for concentrating a specimen solution contained in the flask, while simultaneously heating the specimen by means of an isothermal heating source, comprising:

a lift means operatively supporting the flask for selective vertical movement of the flask relative to the isothermal heating source;
a lift motor operatively associated with the lift means to move the flask up and down relative to the isothermal heating source;
a motor selectively operative to rotate the flask supported by the lift means;
a vacuum source;
a three-way solenoid valve connected to the vacuum source and to atmospheric air pressure, and connected in communication with the interior of the flask for selectively communicating the vacuum source or atmospheric air pressure into the flask;
a controlling apparatus operatively associated with the motor rotating said flask;
said lift motor being operatively controlled by said controlling apparatus to raise the flask upwardly above the isothermal heating source for achieving a non-heating condition in response to passage of a predetermined concentrating time period;
said flask-rotating motor being operatively associated with said controlling apparatus to automatically stop after operation of the solenoid valve, thereby automating procedures at the end of the concentrating process; and
said controlling apparatus including means selectively operating the three-way valve to subject the interior of the flask to the vacuum source during rotation of the flask and to introduce atmospheric air pressure into the flask at a predetermined end of the concentrating process.

* * * * *